United States Patent
Wuerdinger et al.

(12)

(10) Patent No.: US 10,385,920 B1
(45) Date of Patent: Aug. 20, 2019

(54) COMBINATION BEARING WITH OIL RETAINER FEATURE

(71) Applicant: SCHAEFFLER TECHNOLOGIES AG & CO. KG, Herzogenaurach (DE)

(72) Inventors: Daniel Wuerdinger, Troy, MI (US); James Brown, Rock Hill, SC (US); Charles Schwab, Fort Mill, SC (US); Seth Claus, Charlotte, NC (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 15/987,044

(22) Filed: May 23, 2018

(51) Int. Cl.
*F16C 33/66* (2006.01)
*F16C 19/36* (2006.01)

(52) U.S. Cl.
CPC .......... *F16C 33/664* (2013.01); *F16C 19/361* (2013.01)

(58) Field of Classification Search
CPC ...... F16C 19/381; F16C 19/188; F16C 19/49; F16C 33/664
See application file for complete search history.

(56) References Cited

U.S. PATENT DOCUMENTS

| | | | | |
|---|---|---|---|---|
| 3,168,359 A | * | 2/1965 | Murphy | F16C 19/381 384/454 |
| 3,632,178 A | * | 1/1972 | Pitner | F16C 19/381 384/455 |
| 3,829,181 A | * | 8/1974 | Gunther | F16C 19/30 384/455 |
| 3,934,956 A | * | 1/1976 | Pitner | F16C 19/30 384/455 |
| RE29,583 E | * | 3/1978 | Eckhardt | F16C 19/381 384/455 |
| 4,749,287 A | * | 6/1988 | Anguera | F16C 19/49 384/484 |
| 5,158,375 A | * | 10/1992 | Uchida | F16C 19/30 384/455 |
| 6,827,498 B2 | * | 12/2004 | Fugel | F16C 19/30 384/620 |
| 8,408,805 B2 | * | 4/2013 | Winkler | F16C 33/543 384/455 |
| 9,062,710 B2 | * | 6/2015 | Lee | F16C 19/381 |
| 9,581,193 B2 | | 2/2017 | Brzezinski et al. | |
| 9,709,088 B2 | | 7/2017 | Claus et al. | |

* cited by examiner

*Primary Examiner* — Thomas R Hannon
(74) *Attorney, Agent, or Firm* — Brooks Kushman P.C.

(57) ABSTRACT

A combination bearing is configured to support both axial loads and radial loads. The combination bearing includes a bearing housing including a radial bearing ring and an axial bearing cup. Radial rolling elements are located within the radial bearing ring, are configured to support a radial load, and collectively rotate about a central axis. Axial rolling elements are located within the axial bearing cup, are configured to support an axial load, and are axially offset from the radial rolling elements along the axis. An axial washer directly contacts the axial rolling elements. The axial washer is configured to support the axial load and transfer it toward the axial rolling elements. A sealing washer is disposed about the axis and spaced axially from the axial washer. Oil is retained within the combination bearing during free-wheeling conditions with little to no external oil supply.

16 Claims, 3 Drawing Sheets

US 10,385,920 B1

COMBINATION BEARING WITH OIL RETAINER FEATURE

TECHNICAL FIELD

The present disclosure relates to rolling bearings, and more particularly to combined load rolling bearings with an oil retaining feature to maintain lubrication during freewheeling conditions with little to no external oil supply.

BACKGROUND

A rolling-element bearing, also known as a rolling bearing, is a bearing which carries a load by placing rolling elements (such as balls or rollers) between two bearing rings or races. The relative motion of the races causes the rolling elements to roll with very little rolling resistance or sliding. Rolling bearings are widely used in a plethora of mechanical applications.

A combined load rolling bearing, also known as a combination bearing, can include separately arranged axial rollers and radial rollers which are capable of supporting both radial and axial loads from a rotating part. In short, a combined bearing can support both axial and radial loads from rotating parts. Combined bearings are commonly used in various applications, such as automotive transmissions.

SUMMARY

In one embodiment, a combination bearing is provided, being configured to support both axial loads and radial loads. The combination bearing includes a bearing housing including a radial bearing ring and an axial bearing cup. The combination bearing further includes a plurality of radial rolling elements located within the radial bearing ring and configured to support a radial load and collectively rotate about a central axis. The combination bearing further includes a plurality of axial rolling elements located within the axial bearing cup and configured to support an axial load, the axial rolling elements axially offset from the radial rolling elements along the axis. The combination bearing includes an axial washer disposed about the axis and in direct contact with the axial rolling elements, and a sealing washer disposed about the axis and spaced axially from the axial washer.

According to another embodiment, a combination bearing includes a plurality of radial rolling elements arranged about an axis and configured to support a radial load. A plurality of axial rolling elements are arranged about the axis and are configured to support an axial load. An axial washer has a first axial side directly contacting the axial rolling elements and a second axial side facing away from the axial rolling elements. The axial washer is configured to transfer the axial load therethrough and to the axial rolling elements. A sealing washer is axially spaced from the second axial side of the axial washer to define a gap therebetween.

In yet another embodiment, a combination bearing includes a plurality of radial rolling elements arranged about an axis and configured to support a radial load, as well as a plurality of axial rolling elements arranged about the axis and configured to support an axial load. The combination bearing has an axial washer directly contacting the axial rolling elements

DETAILED DESCRIPTION

Figure 1:
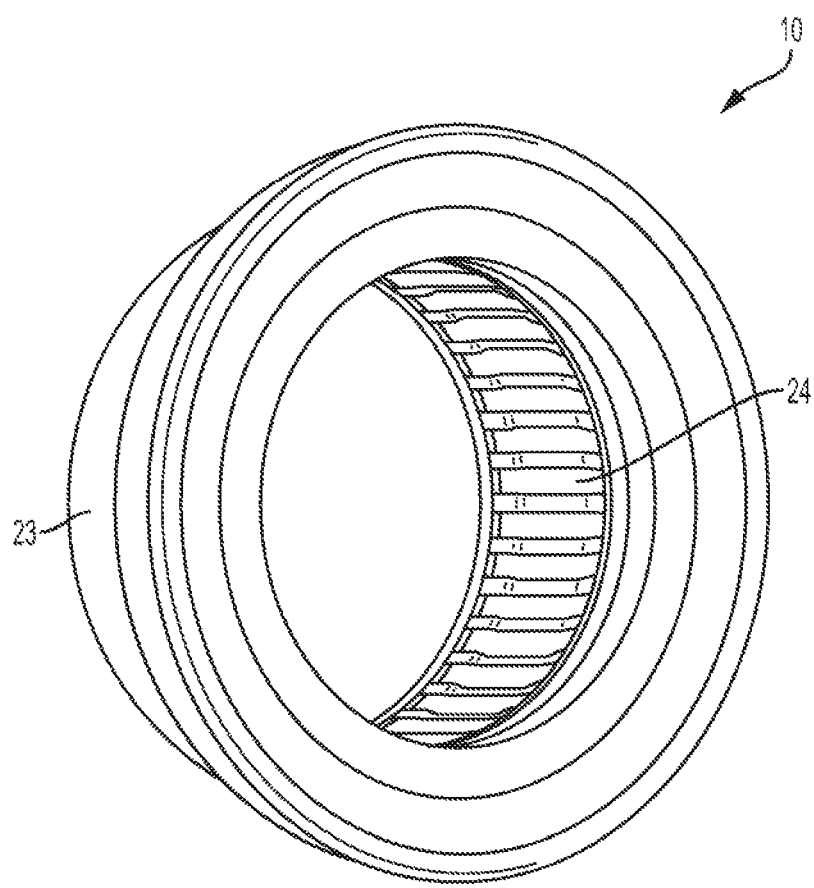
FIG. 1 is a perspective view of a combined load rolling bearing, according to one embodiment.
Figure 2:
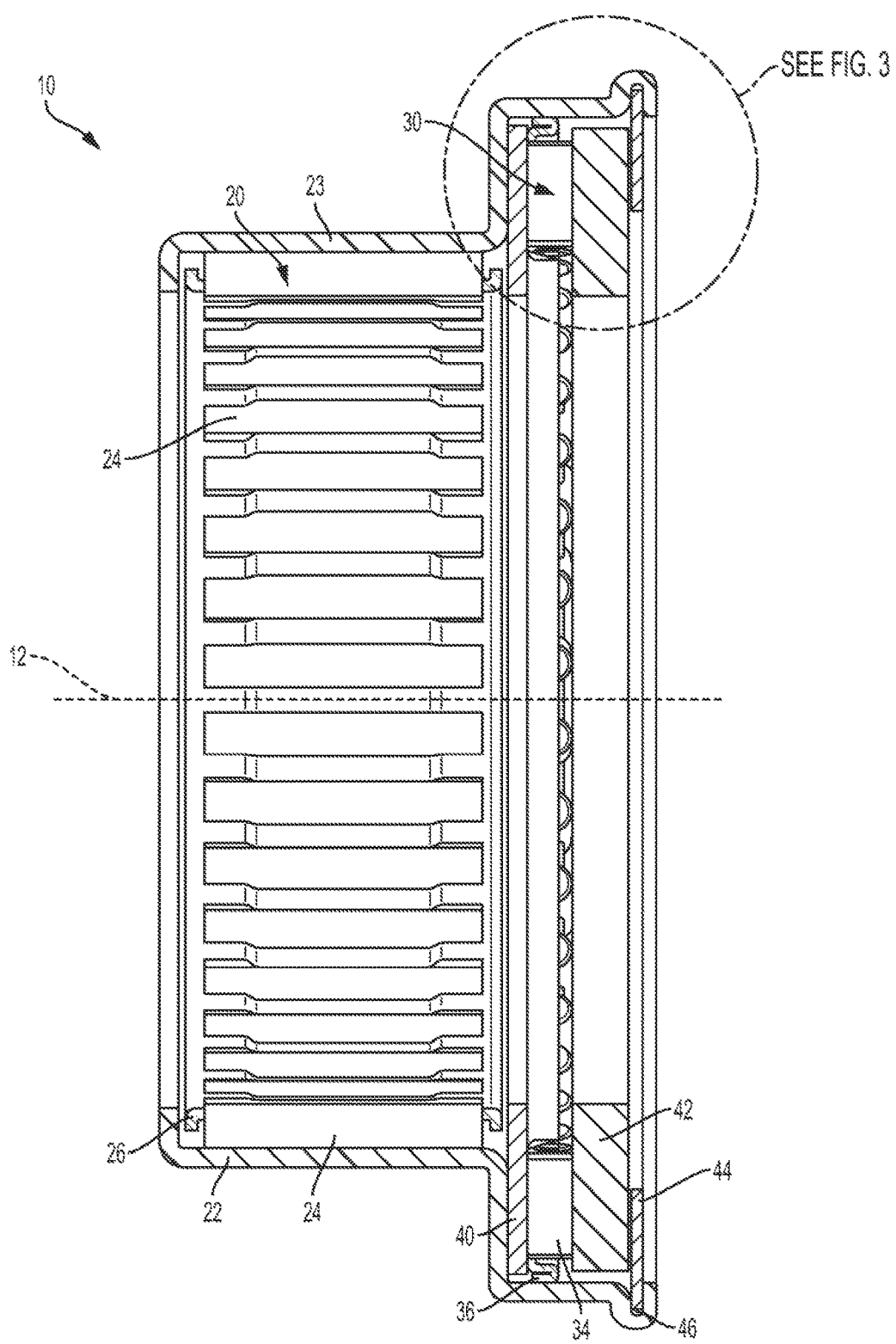
FIG. 2 is a cross-sectional view of the combined load rolling bearing of FIG. 1.
Figure 3:
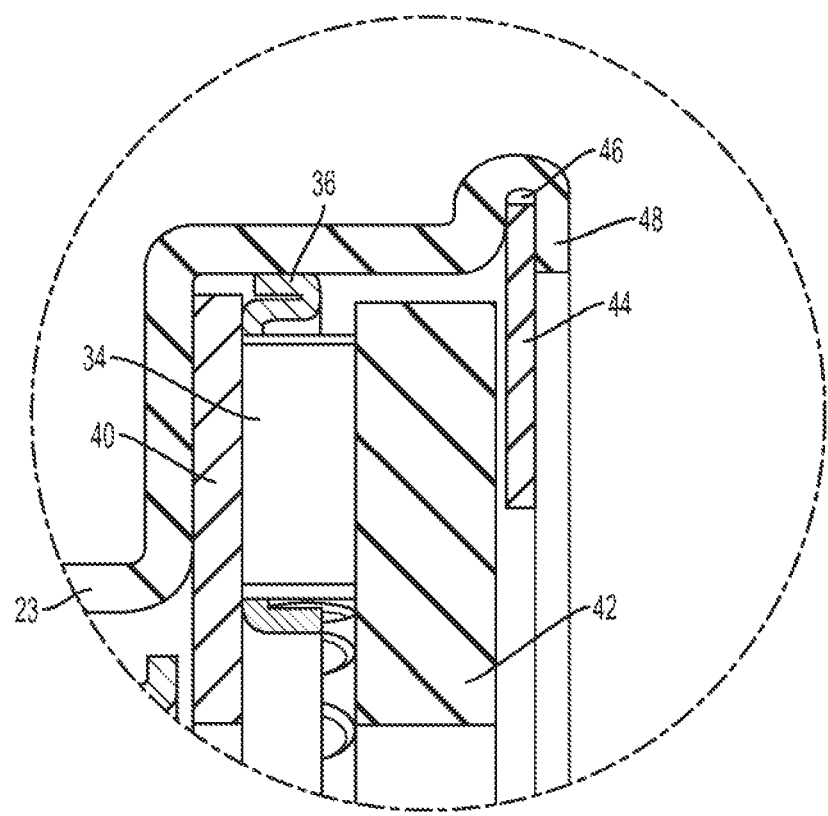
FIG. 3 is an enlarged cross-sectional view of a labeled region of FIG. 2.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology is used in the following description for convenience, and is not intended to be limiting unless otherwise noted. Words such as "inner" and "outer" are intended to mean directions towards and away from the part noted. For example, if a structural component is said to have an "inner" surface, it is a surface facing inward toward a central point or axis. Likewise, if the structural component is said to have an "outer" surface, it is a surface facing outward away from the central point or axis. Also, the term "axial" refers to a direction along or parallel to the axis shown in the Figures; the term "radial" refers to a direction radially outward or transverse from the axial direction.

A combination bearing, such as the one disclosed herein, includes a radial bearing and an axial bearing. Typically, the radial bearing and axial bearing are enclosed within a housing or outer shell. In certain applications, the combination bearing is wet (i.e., lubricated). And, in certain applications, the only way to properly circulate lubricant throughout the combination bearing is to actually rotate the components within the combination bearing. If the combination bearing is selectively activated (for example, via a clutch), then there may be times in which the combination bearing remains motionless for an extended period of time. This can cause the lubrication to drain out of the combination bearing. Then, once actuated, this could cause the combination bearing to immediately withstand relatively high rotational speeds with little to no lubrication immediately available throughout the combination bearing during operation.

Therefore, according to various embodiments described herein, a combination bearing with an oil retention feature is provided. The oil retention feature of the combination bearing retains oil during times of little to no external oil supply to the bearing, allowing oil to be available during these operating conditions.

Referring to the Figures, a combined axial and radial bearing assembly 10 (also referred to as a combination bearing) is illustrated. The combination bearing 10 is configured to support both axial loads and radial loads. The combination bearing 10 is configured to rotate about a central axis 12, and linearly along the axis 12. To do so, the combination bearing 10 has both a radial bearing 20 and an axial bearing 30. Both bearings may be housed within a common housing or outer shell. Alternatively, the bearings 20, 30 may have separate housings or shells connected to one another.

The radial bearing 20 includes a radial outer bearing ring 22 having a constant inner and outer diameter. The outer bearing ring 22 may be formed by drawing a metal blank into a cup shape. In other words, the outer bearing ring 22 may be a drawn cup. The drawn cup may be referred to as an outer shell or housing 23 of the combination bearing 10. An inner surface of the outer bearing ring 22 contacts a plurality of radial rolling elements 24. In this fashion, the inner surface of the outer bearing ring 22 defines an outer race of the radial bearing 20. Like the axial rolling elements described below, the radial rolling elements 24 may be spherical, cylindrical, or the like. The radial rolling elements 24 are bound together and contained in a fixed arrangement about the central axis 12 by a radial cage 26. In this fashion, the radial rolling elements 26 are each configured to rotate about their respective rolling element axis, and the radial rolling elements 26 collectively are configured to rotate about the central axis 12. This allows the radial bearing 20 to support radial loads and rotate radially about the axis 12.

The axial bearing 30 may also be located within the interior of the drawn cup or housing 23. In other words, the outer bearing ring 22 may be made of the same material and formed from the same sheet of metal as the metal directly radially outward of the axial bearing 30. The axial bearing includes axial rolling elements 34 which again may be spherical, cylindrical, or other types of rollers. The axial rolling elements 34 are bound together and contained in a fixed arrangement about the central axis 12 by an axial cage 36, also referred to as a thrust cage. In the illustrated embodiment, the direction of the axial rolling elements 34 is transverse from the direction of the radial rolling elements 24. In other words, each rolling element 34 individually rotates about an axis that extends in a radial direction from the central axis 12. Also, the rolling elements 34 may be collectively configured to rotate as a unit around the central axis 12.

The axial rolling elements may directly contact a pair of washers on either side of the rolling elements. For example, in the illustrated embodiment, a first axial washer 40 makes direct contact with the axial rolling elements 34. The first axial washer 40 therefore may act as an axial bearing ring. Also, a second axial washer 42 may make direct contact with the axial rolling elements 34 on an opposite side of the rolling elements 34 relative to the first axial washer 40. This allows the axial rolling elements 34 to support axial loads rotate as the combination bearing 10 moves linearly along the central axis 12.

The first axial washer 40 may be axially spaced from the radial rolling elements 24 so as to not interfere with their rotation or operation. The housing 23 may be drawn or formed to support and house the first axial washer 40 having a larger outer diameter than the collective outer diameter of the radial bearing 20. Thus, the housing 23 has a shoulder or stepped configuration to support the changing diameters. The first axial washer 40 may be radially spaced inwardly from the housing 23 while making face-to-face contact with the interior of the shoulder of the housing 23. The first axial washer 40 may be annularly shaped with an inner diameter at least as large as the inner diameter of the radial bearing 20 to allow a shaft or the like to pass through the combination bearing 10.

The second axial washer 42 may be significantly thick to support axial loads and transfer the loads axially to the axial rolling elements 34. In one embodiment, the second axial washer 42 is thicker than the first axial washer, and may also be thicker than the rolling elements 34. The second axial washer 42 may have an outer diameter less than the inner diameter of the housing 23 at a common axial location. In other words, the second axial washer 42 may be radially spaced inwardly from the housing 23 to define a gap therebetween. Lubricant (e.g., fluid, oil) may travel through and within this gap during operation of the combined bearing 10.

A sealing washer 44 may also be provided. In one embodiment, the sealing washer 44 is thinner than both the first axial washer 40 and the second axial washer 42. The sealing washer 44 may also have an outer diameter that exceeds that of both the first and second axial washers. To accommodate the enlarged outer diameter of the sealing washer 44, the housing 23 may be bent to define a circumferential bulge extending about the axis 12 to define a circumferential groove 46 in the interior of the housing 23. The sealing washer 44 is received in the groove 46 and provides a sealing function to at least partially contain the lubricant within the bearing. In particular, the sealing washer 44 may be axially spaced from the second axial washer 42 to define an axial gap therebetween. To contain the sealing washer 44, the housing 23 may be bent at an annular end flange 48 that extends radially inward and axially covers a portion of the sealing washer 44.

With the arrangements disclosed herein, the lubricant is now able to flow throughout the bearing during normal operation, but at least a portion of the lubricant can be sealed and contained within the bearing during times in which the bearing does not rotate or receive loads or during operating conditions in which there is no external oil supply available. A pocket or flow path of lubricant is provided radially between the first axial washer 40 and the housing 23. The lubricant can flow from there, axially through the axial bearing 30, and between the axial gap between the second axial washer 42 and the housing 23. The lubricant can flow from there to the gap located radially between the second axial washer 42 and the sealing washer 44, where the lubricant can flow in the radial direction along the second axial washer 42. In short, fluid communication is made in a sealed and contained manner amongst (1) the gap located radially between the first axial washer 40 and the housing 23, (2) the gap located radially between the second axial washer 42 and the housing 23, and (3) the gap located axially between the second axial washer 42 and the sealing washer 44. This creates an oil sump and a labyrinth sealing to retain the lubricant in the combination bearing 10, allowing the lubricant to be readily available for when the combination bearing 10 is actuated.

In one embodiment, the combination bearing described above can be used in a transfer case of a vehicle to selectively activate all-wheel drive in which drive power can be sent to both front and rear axles. In such a case, a sprocket drive may selectively (e.g., via a clutch) transfer rotational force to the combination bearing when all-wheel drive is activated. During all-wheel drive, the shaft speed and the speed of the housing of the bearing are the same; the bearing is statically loaded, the chain on the sprocket is spinning and is churning oil toward the bearing. However, in these statically-loaded conditions in which the bearing's inner and outer raceway have the same rotational speed, not much oil is needed in the bearing. When all-wheel drive is disconnected, the chain is not turning, the outer raceway of the bearing is stationary, but the inner shaft is still rotating with engine speed. During these times, the bearing receives little or no new oil due to the chain not spinning and oil not churning. However, the bearing may be spinning (e.g., 5000 rpm) with relative speed between the inner and outer raceways. The structure described above maintains oil in the bearing during these times when oil is needed but little or no new oil is provided or circulated to the bearing.

PARTS LIST

The following is a list of components labeled in the Figures; however, these terms are not intended to be limited to only the embodiments shown in the Figures.
- 10 combination bearing
- 12 central axis
- 20 radial bearing
- 22 radial outer bearing ring
- 23 drawn cup or housing
- 24 radial rolling element
- 26 radial cage
- 30 axial bearing
- 34 axial rolling element
- 36 axial cage
- 40 first axial washer
- 42 second axial washer
- 44 sealing washer
- 46 groove
- 48 flange While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A combination bearing configured to support both axial loads and radial loads, the combination bearing comprising:
    a bearing housing including a radial bearing ring and an axial bearing cup;
    a plurality of radial rolling elements located within the radial bearing ring and configured to support a radial load and collectively rotate about a central axis;
    a plurality of axial rolling elements located within the axial bearing cup and configured to support an axial load, the axial rolling elements axially offset from the radial rolling elements along the axis;
    an axial washer disposed about the axis and in direct contact with the axial rolling elements; and
    a sealing washer disposed about the axis and spaced axially from the axial washer;
    wherein the bearing housing defines an annular pocket that receives the sealing washer, and wherein the bearing housing has an outer surface defining a bulge axially aligned with the sealing washer.

2. The combination bearing of claim 1, wherein the axial washer is thicker in the axial direction than the sealing washer.

3. The combination bearing of claim 1, wherein the axial washer is radially spaced from the bearing housing.

4. The combination bearing of claim 3, wherein a fluid pathway is provided axially from the axial rolling elements, outward of the axial washer and to an axial face of the sealing washer.

5. The combination bearing of claim 1, wherein the axial rolling elements, the axial washer, and the sealing washer are all disposed within the axial bearing cup.

6. A combination hearing configured to support both axial loads and radial loads, the combination bearing comprising:
    a plurality of radial rolling elements arranged about an axis and configured to support a radial load;
    a plurality of axial rolling elements arranged about the axis and configured to support an axial load;
    an axial washer having a first axial side directly contacting the axial rolling elements and a second axial side facing away from the axial rolling elements, wherein the axial washer is configured to transfer the axial load therethrough and to the axial rolling elements; and
    a sealing washer having an axial side facing the second axial side of the axial washer, axially overlapping the second axial side of the axial washer, and axially spaced from the second axial side of the axial washer to define an axial gap therebetween.

7. The combination bearing of claim 6, further comprising a bearing housing having an inner surface directly contacting the radial rolling elements and radially spaced from the axial washer.

8. The combination bearing of claim 7, wherein the bearing housing is a single drawn component.

9. The combination bearing of claim 7, wherein the bearing housing is bent at one axial end thereof to define an annular pocket that receives the sealing washer.

10. The combination bearing of claim 6, wherein the axial washer is thither in the axial direction than the sealing washer.

11. The combination bearing of claim 6, wherein the axial washer is a first axial washer, and the combination bearing further comprises a second axial washer having a first axial side directly contacting a housing of the combination bearing and a second axial side directly contacting the axial rolling elements.

12. A combination bearing comprising:
    a plurality of radial rolling elements arranged about an axis and configured to support a radial load;
    a plurality of axial rolling elements arranged about the axis and configured to support an axial load; and
    a first axial washer directly contacting the axial rolling elements;
    a second axial washer directly contacting axial rolling elements, the second axial washer having a first axial side contacting the axial rolling elements and a second axial side; and
    a sealing washer having a first axial side facing the second axial side of the second axial washer, wherein the first axial side of the sealing washer is axially spaced from and axially overlaps with the second axial side of the second axial washer.

13. The combination bearing of claim 12, further comprising a drawn cup with a first open end and a second open end, wherein the drawn cup contains the radial rolling elements, the axial rolling elements the second axial washer and the sealing washer.

14. The combination bearing of claim 13, wherein an inner surface of the drawn cup includes an annular groove that receives the sealing washer.

15. The combination bearing of claim 13, wherein the second axial washer is radially spaced from the drawn cup.

16. The combination bearing of claim 12, wherein the second axial washer is thicker than the sealing washer.

* * * * *